(No Model.)
F. A. PICKERING.
VISE.
No. 528,912. Patented Nov. 6, 1894.
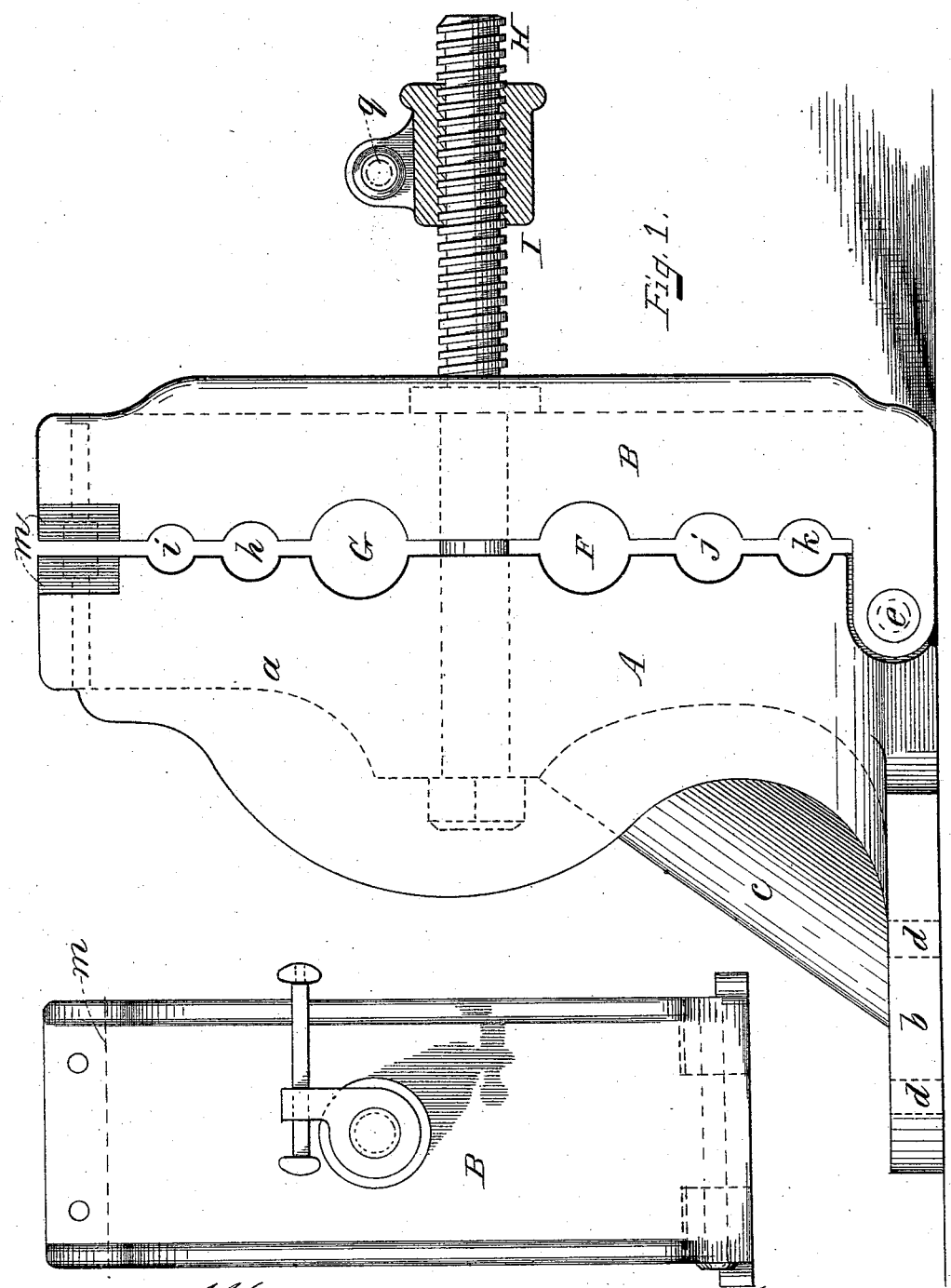

UNITED STATES PATENT OFFICE.

FRANK A. PICKERING, OF MEDFORD, MASSACHUSETTS.

VISE.

SPECIFICATION forming part of Letters Patent No. 528,912, dated November 6, 1894.

Application filed March 23, 1892. Serial No. 426,098. (No model.)

*To all whom it may concern:*

Be it known that I, FRANK A. PICKERING, of Medford, in the county of Middlesex and State of Massachusetts, have invented a new and useful Improvement in Vises, which will, in connection with the accompanying drawings, be hereinafter fully described, and specifically defined in the appended claim.

In said drawings, Figure 1, is an enlarged side elevation of a vise made in accordance with my improvements, and Fig. 2 is a front elevation of Fig. 1.

The object of this invention is to produce a vise at low cost, that will, in addition to grasping and holding sections of pipe and other cylindrical rods, also serve the more ordinary purposes of a vise; and it consists in the features of novelty specified in the vise shown and described.

Referring again to said drawings, A represents the standing jaw; it being formed with standing part $a$, and the flange $b$ for attachment to a bench or other support by bolts that enter holes $d$. The front adjustable jaw B, is secured to A at $e$, by a pivot as shown.

The steel jaws are shown at $m$, and as secured to A and B by screws. The cylindrical bodies that are held by this vise are inserted in such of the seats F, G, $h$, $i$, $j$ or $k$, as their size or the required pressure thereon may require; those below screw H, receiving a greater pressure, with same force exerted by said screw than those above it. Said screw H, is provided with a nut I, provided with a rod $q$, by which to actuate it. The flange $c$ is formed midway between the side flanges of A and serves to strengthen the base $b$.

By forming the pipe seats F, G, $h$, $i$, $j$ and $k$, in jaws A, B, and with all or part of said seats below screw H (between H and flange $b$), not only can a greater pressure be exerted upon a pipe thus placed in the vise, but by having such plurality of seats of varying sizes, the same vise has a greater range of capacity for varying sizes of pipe than if the jaws $m$, with one or two pipe seats, were alone employed.

I claim as my invention—

The combination in a vise of standing jaw A, having the upright portion $a$, and the horizontal flange $b$ for securing it in place for use; the movable jaw B, pivoted to jaw A at $e$, the holding screw H passing through said jaws at about the center of their length, an actuating nut I, provided with lever $q$; steel jaws $m$ secured to jaws A and B, and a series of semicircular seats cut in the meeting faces of said jaws both above and below screw H, to hold varying sizes of pipe, substantially as specified.

FRANK A. PICKERING.

Witnesses:
 EUGENE HUMPHREY,
 RALPH W. E. HOPPER.